US012620362B2

(12) United States Patent
Park et al.

(10) Patent No.: US 12,620,362 B2
(45) Date of Patent: May 5, 2026

(54) DRIVING CIRCUIT

(71) Applicant: Samsung Display Co., Ltd., Yongin-si (KR)

(72) Inventors: Junhyun Park, Yongin-si (KR); Youngwan Seo, Yongin-si (KR); Soil Yoon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/017,323

(22) Filed: Jan. 10, 2025

(65) Prior Publication Data

US 2025/0273162 A1 Aug. 28, 2025

(30) Foreign Application Priority Data

Feb. 26, 2024 (KR) ........................ 10-2024-0027502

(51) Int. Cl.
*G09G 3/3266* (2016.01)
*G09G 3/3225* (2016.01)

(52) U.S. Cl.
CPC ......... *G09G 3/3266* (2013.01); *G09G 3/3225* (2013.01); *G09G 2300/0842* (2013.01); *G09G 2310/0286* (2013.01)

(58) Field of Classification Search
CPC ........................... G09G 3/3266; G09G 3/3677
See application file for complete search history.

(56) References Cited

U.S. PATENT DOCUMENTS

| | | | | |
|---|---|---|---|---|
| 9,299,296 | B2 * | 3/2016 | Yamazaki | G09G 3/36 |
| 11,132,946 | B2 * | 9/2021 | Yang | G09G 3/3233 |
| 11,594,182 | B2 | 2/2023 | Xue et al. | |
| 11,699,391 | B2 * | 7/2023 | Kimura | H10D 86/60 345/55 |
| 12,394,364 | B2 * | 8/2025 | Shin | G09G 3/3266 |
| 2016/0042806 | A1 * | 2/2016 | Ogawa | G11C 19/28 377/64 |
| 2017/0069283 | A1 * | 3/2017 | You | G11C 19/28 |
| 2019/0088190 | A1 * | 3/2019 | Zhang | G09G 3/20 |

(Continued)

FOREIGN PATENT DOCUMENTS

| | | | |
|---|---|---|---|
| CN | 110415648 | A | 11/2019 |
| CN | 115909971 | A | 4/2023 |
| KR | 10-2024-0144659 | A | 10/2024 |

*Primary Examiner* — Sepehr Azari
(74) *Attorney, Agent, or Firm* — Womble Bond Dickinson (US) LLP

(57) ABSTRACT

A stage of a driving circuit includes seventh and eighth transistors electrically connected between a first terminal for receiving a first voltage and a second terminal for receiving a second voltage that is lower than the first voltage, ninth and tenth transistors electrically connected between the first and second terminals, and a fourth transistor including a gate electrically connected to a first node configured to receive the start signal and a back gate electrically connected to a third node, and electrically connected between the second terminal and a second node to which a gate of the eighth transistor is electrically connected, a fifth transistor electrically connected between the first node and the third node, and including a gate electrically connected to the second terminal, and a second capacitor electrically connected to the third node and to a second output node between the ninth and tenth transistors.

19 Claims, 9 Drawing Sheets

(56) References Cited

U.S. PATENT DOCUMENTS

| | | | | |
|---|---|---|---|---|
| 2020/0320937 | A1* | 10/2020 | Yang | G09G 3/3258 |
| 2021/0012708 | A1* | 1/2021 | Yang | G09G 3/3225 |
| 2021/0056908 | A1* | 2/2021 | Park | G09G 3/3275 |
| 2021/0118375 | A1* | 4/2021 | Yang | G09G 3/3266 |
| 2022/0375535 | A1* | 11/2022 | Otose | G09G 3/20 |
| 2024/0030905 | A1* | 1/2024 | Kimura | G09G 3/36 |
| 2024/0090264 | A1* | 3/2024 | Kim | H10K 59/1213 |
| 2024/0321216 | A1 | 9/2024 | Park et al. | |
| 2024/0420644 | A1* | 12/2024 | Gui | G09G 3/3266 |
| 2025/0218390 | A1* | 7/2025 | Kim | G09G 3/3233 |

* cited by examiner

DRIVING CIRCUIT

CROSS-REFERENCE TO RELATED APPLICATION

The present application claims priority to, and the benefit of, Korean Patent Application No. 10-2024-0027502, filed on Feb. 26, 2024, in the Korean Intellectual Property Office, the disclosure of which is incorporated by reference herein in its entirety.

BACKGROUND

1. Field

One or more embodiments relate to a driving circuit for outputting a gate signal, and a display apparatus including the driving circuit.

2. Description of the Related Art

A display apparatus includes a pixel area including a plurality of pixels, a gate-driving circuit, a data-driving circuit, a controller, and/or the like. The gate-driving circuit includes stages connected to gate lines, and the stages respectively supply gate signals to the gate lines connected thereto in response to signals from the controller.

SUMMARY

One or more embodiments include a driving circuit capable of stably outputting a gate signal at low power, and a display apparatus including the driving circuit. Technical solutions to be achieved by the disclosure are not limited to the technical solutions mentioned above, and other technical solutions not mentioned above may be clearly understood from the description of the disclosure by those of ordinary skill in the art.

Additional aspects will be set forth in part in the description that follows and, in part, will be apparent from the description, or may be learned by practice of the presented embodiments of the disclosure.

According to one or more embodiments, a driving circuit includes stages, the stages including a first output circuit configured to output an output signal, and including a seventh transistor and an eighth transistor electrically connected between a first voltage input terminal for receiving a first voltage and a second voltage input terminal for receiving a second voltage that is lower than the first voltage, a second output circuit configured to output a carry signal, and including a ninth transistor and a tenth transistor electrically connected between the first voltage input terminal and the second voltage input terminal, and a control circuit electrically connected to the first output circuit, to the second output circuit, and to an input terminal configured to receive a start signal, and including a fourth transistor including a gate electrically connected to a first node configured to receive the start signal and a back gate electrically connected to a third node, and electrically connected between the second voltage input terminal and a second node to which a gate of the eighth transistor is electrically connected, a fifth transistor electrically connected between the first node and the third node, and including a gate electrically connected to the second voltage input terminal, and a second capacitor electrically connected to the third node and to a second output node between the ninth transistor and the tenth transistor.

When a voltage of the first node is at a high level, a voltage of the third node may be at a high level that is substantially equal to the high level of the voltage of the first node, wherein, when the voltage of the first node is at a low level, the voltage of the third node is at a low level that is lower than the low level of the voltage of the first node.

The fourth transistor may include an N-channel transistor, and the fifth transistor may include a P-channel transistor.

The fourth transistor may include an oxide transistor, and the fifth transistor may include a silicon transistor.

The first output circuit may further include a sixth transistor electrically connected between the second voltage input terminal and a first output node between the seventh transistor and the eighth transistor, and including a gate electrically connected to the third node.

The control circuit may further include a first transistor electrically connected between the input terminal and the first node, and including a gate electrically connected to a first clock terminal configured to receive a first clock signal, and a second transistor electrically connected between the input terminal and the first node, and including a gate electrically connected to a second clock terminal configured to receive a second clock signal.

The second transistor may further include a back gate electrically connected to a third terminal configured to receive a third voltage that is lower than the second voltage.

The second clock signal may be an inverted signal of the first clock signal.

The control circuit may further include a third transistor electrically connected between the first voltage input terminal and the second node, and including a gate electrically connected to the first node.

The eighth transistor may include a back gate electrically connected to a third terminal configured to receive a third voltage that is lower than the second voltage.

The tenth transistor may include a back gate electrically connected to a third terminal configured to receive a third voltage that is lower than the second voltage.

The driving circuit may further include a third output circuit including a thirteenth transistor and a fourteenth transistor electrically connected between the first voltage input terminal and the second voltage input terminal, and configured to output a second carry signal, wherein, when the carry signal is at a high level, the second carry signal is at a low level, and wherein, when the carry signal is at a low level, the second carry signal is at a high level.

The control circuit may further include a twelfth transistor electrically connected between the second node and a fourth node, and including a gate electrically connected to the second voltage input terminal, and a third capacitor electrically connected to the fourth node and to a third output node between the thirteenth transistor and the fourteenth transistor, wherein the eighth transistor includes a back gate electrically connected to the fourth node.

When a voltage of the second node is at a high level, a voltage of the fourth node may be at a high level that is substantially equal to the high level of the voltage of the second node, wherein, when the voltage of the second node is at a low level, the voltage of the fourth node is at a low level that is lower than the low level of the voltage of the second node.

According to one or more embodiments, a driving circuit includes stages, the stages including a seventh transistor and an eighth transistor electrically connected between a first voltage input terminal configured to receive a first voltage and a second voltage input terminal configured to receive a second voltage that is lower than the first voltage, and configured to transmit an output signal to a first output terminal, a ninth transistor and a tenth transistor electrically connected between the first voltage input terminal and the second voltage input terminal, and configured to transmit a carry signal to a second output terminal, a first transistor electrically connected between a first node and an input terminal configured to receive a start signal, and including a gate configured to receive a clock signal, and a fourth transistor electrically connected between the second voltage input terminal and a second node to which a gate of the eighth transistor is electrically connected, and including a gate electrically connected to the first node and a back gate configured to receive an alternating current voltage.

The driving circuit may further include a fifth transistor electrically connected between the first node and a third node, and including a gate electrically connected to the second voltage input terminal, and a first capacitor electrically connected to the third node and to the second output terminal, wherein the back gate of the fourth transistor is electrically connected to the third node.

When a voltage of the first node is at a high level, a voltage of the third node may be at a high level that is substantially equal to the high level of the voltage of the first node, wherein, when the voltage of the first node is at a low level, the voltage of the third node is at a low level that is lower than the low level of the voltage of the first node.

The driving circuit may further include a sixth transistor electrically connected between the first output terminal and the second voltage input terminal, and including a gate electrically connected to the third node.

The driving circuit may further include a thirteenth transistor and a fourteenth transistor electrically connected between the first voltage input terminal and the second voltage input terminal, and configured to transmit a second carry signal to a third output terminal, a twelfth transistor electrically connected between the second node and a fourth node, and including a gate electrically connected to the second voltage input terminal, and a third capacitor electrically connected to the fourth node and to the third output terminal, wherein the eighth transistor includes a back gate electrically connected to the fourth node.

When a voltage of the second node is at a high level, a voltage of the fourth node may be at a high level that is substantially equal to the high level of the voltage of the second node, wherein, when the voltage of the second node is at a low level, the voltage of the fourth node is at a low level that is lower than the low level of the voltage of the second node.

BRIEF DESCRIPTION OF THE DRAWINGS

The above and other aspects of embodiments of the disclosure will be more apparent from the following description taken in conjunction with the accompanying drawings, in which.

DETAILED DESCRIPTION

Figure 1:
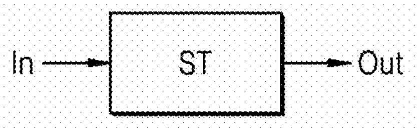
FIG. 1 is a diagram schematically illustrating a stage of a driving circuit according to one or more embodiments.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that the present disclosure covers all modifications, equivalents, and replacements within the idea and technical scope of the present disclosure, that each of the features of embodiments of the present disclosure may be combined with each other, in part or in whole, and technically various interlocking and operating are possible, and that each embodiment may be implemented independently of each other, or may be implemented together in an association, unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present.

The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

In the following embodiments, "ON" used in connection with a device state may refer to an activated state of the device, and "OFF" may refer to a deactivated state of the device. "ON" used in connection with a signal received by a device may refer to a signal activating the device, and "OFF" may refer to a signal deactivating the device. The device may be activated by a high-level voltage or a low-level voltage. For example, a P-channel transistor (P-type transistor) may be activated by a low-level voltage, and an N-channel transistor (N-type transistor) may be activated by a high-level voltage. Thus, it should be understood that "ON" voltages for the P-channel transistor and the N-channel transistor are opposite (low versus high) voltage levels. Hereinafter, a voltage activating (turning on) a transistor will be referred to as a gate-on voltage, and a voltage deactivating (turning off) the transistor will be referred to as a gate-off voltage.

Figure 2:
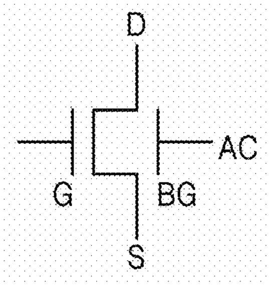
FIG. 2 is a diagram schematically illustrating a signal input to a transistor included in a stage according to one or more embodiments.

FIG. 1 is a diagram schematically illustrating a stage of a driving circuit according to one or more embodiments. FIG. 2 is a diagram schematically illustrating a signal input to a transistor included in a stage according to one or more embodiments.

A driving circuit may include a plurality of stages ST, and each stage ST may receive at least one input signal In, and may generate at least one output signal Out. The at least one input signal In may include a start signal, at least one clock signal, and/or at least one voltage signal.

Each stage ST may include a plurality of transistors. Some of the plurality of transistors may be P-channel transistors, and some others may be N-channel transistors.

Each of the P-channel transistors and the N-channel transistors may be a three-terminal device including a gate G, a source S, and a drain D. In one or more embodiments, each of the P-channel transistors and the N-channel transistors may be a four-terminal device including a gate G, a source S, a drain D, and a back gate BG.

The P-channel transistor may be a silicon transistor. The silicon transistor may include a silicon semiconductor, and the silicon semiconductor may include amorphous silicon, polysilicon, or the like. For example, the silicon transistor may be a low-temperature polycrystalline silicon (LTPS) thin film transistor. A gate-on voltage of the P-channel transistor may be a low-level voltage, and a gate-off voltage thereof may be a high-level voltage.

The N-channel transistor may be an oxide transistor. The oxide transistor may include an oxide semiconductor, and the oxide semiconductor may include a Zn oxide-based material, such as Zn oxide, In—Zn oxide, or Ga—In—Zn oxide. In some embodiments, the oxide semiconductor may be an In—Ga—Zn—O (IGZO) semiconductor. In some embodiments, the oxide semiconductor may be an In—Sn—Ga—Zn—O (ITGZO) semiconductor. For example, the oxide transistor may be a low-temperature polycrystalline oxide (LTPO) thin film transistor. A gate-on voltage of the N-channel transistor may be a high-level voltage, and a gate-off voltage thereof may be a low-level voltage.

As for a 4-terminal N-channel oxide transistor, when a (−) voltage is applied to a back gate BG thereof, a threshold voltage thereof may increase, and thus may be positively shifted (a positive shift), and when a (+) voltage is applied thereto, the threshold voltage may decrease, and thus may be negatively shifted (a negative shift).

A threshold voltage of an oxide transistor may decrease due to a process dispersion, and thus, the oxide transistor may not be turned off. To adjust a threshold voltage of the oxide transistor, a (−) voltage may be applied to a back gate BG thereof to positively shift the threshold voltage. However, as a result, an operation speed of the oxide transistor may decrease, and thus a turn-on current thereof may decrease. When a (+) voltage is applied to the back gate BG of the oxide transistor, a decrease in the operation speed thereof and a decrease in the turn-on current thereof may be reduced or minimized, but the threshold voltage thereof may be negatively shifted.

In one or more embodiments, as illustrated in FIG. 2, an alternating current (AC) voltage may be applied to a back gate BG of an N-channel oxide transistor. For example, a (−) voltage may be applied to the back gate BG of the N-channel oxide transistor in some periods among the operation periods of a stage ST, and a (+) voltage may be applied thereto in some other periods. The (−) voltage may be referred to as a low-level voltage, and the (+) voltage may be referred to as a high-level voltage.

In one or more embodiments, the AC voltage may be a voltage of a corresponding node whose voltage level changes in the stage ST.

Figure 3:
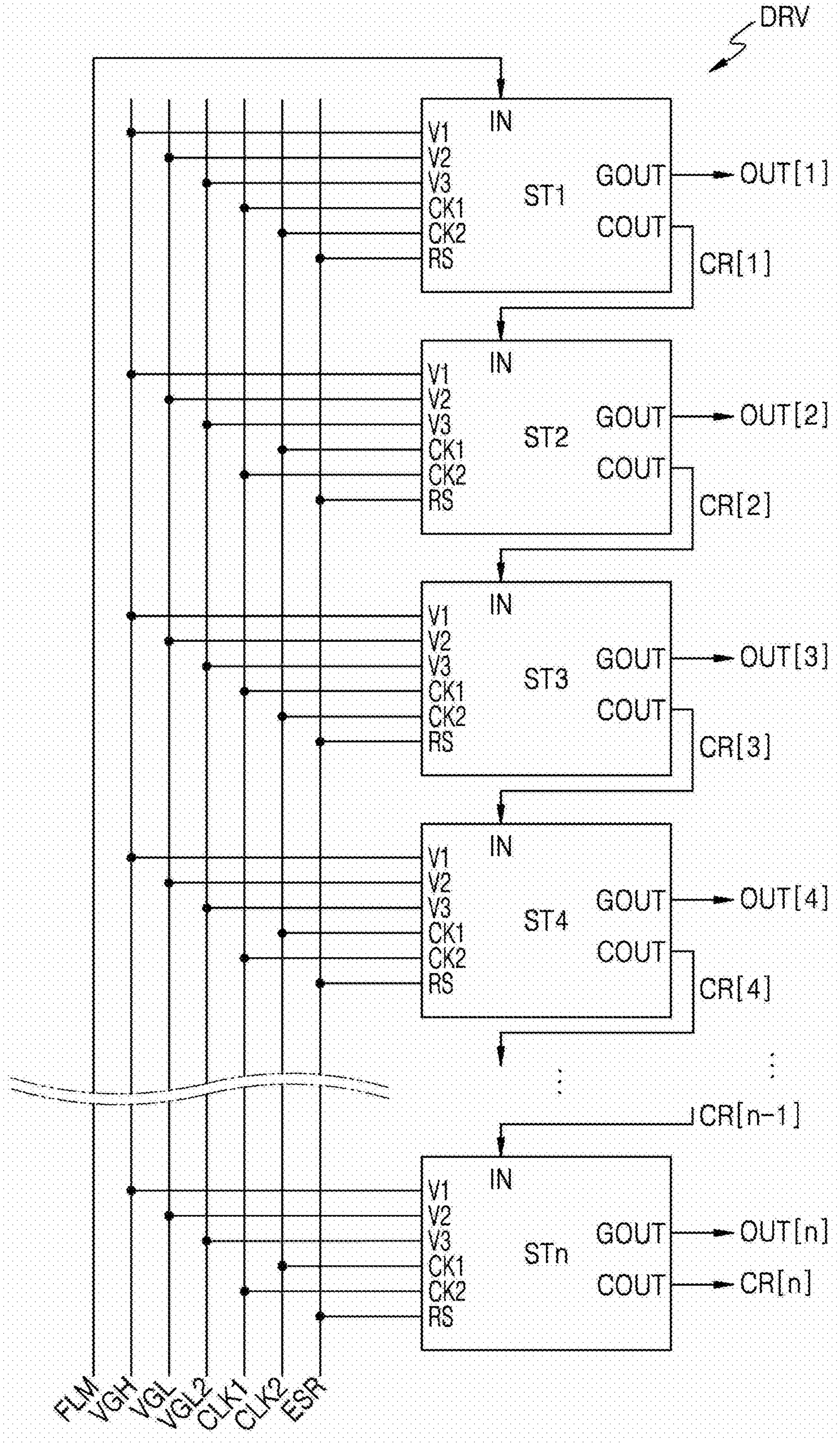
FIG. 3 is a diagram schematically illustrating a driving circuit according to one or more embodiments.
Figure 4:
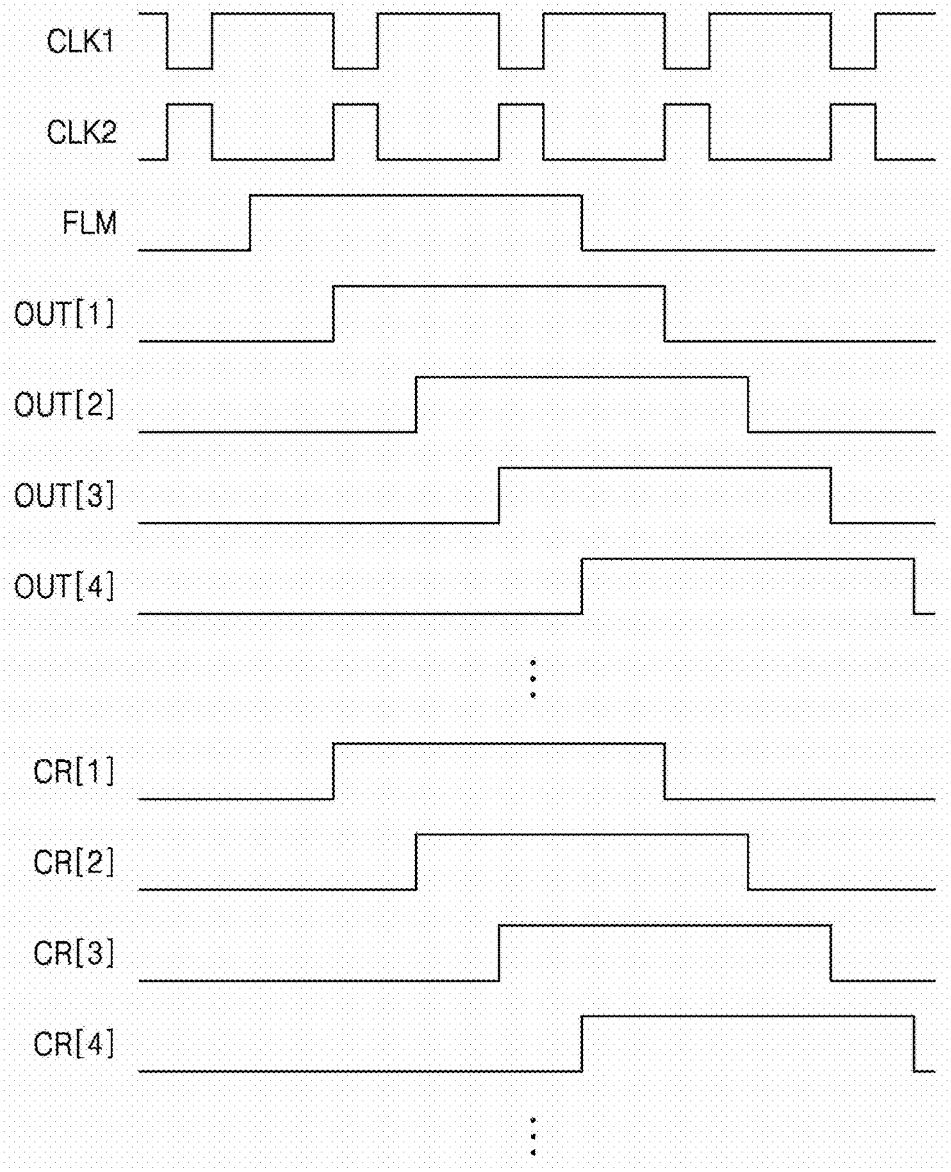
FIG. 4 is a diagram schematically illustrating input and output signals of a driving circuit according to one or more embodiments.

FIG. 3 is a diagram schematically illustrating a driving circuit according to one or more embodiments. FIG. 4 is a diagram schematically illustrating input and output signals of a driving circuit according to one or more embodiments.

Referring to FIG. 3, a driving circuit DRV according to one or more embodiments may include a plurality of stages ST1 to STn. The plurality of stages ST1 to STn may output, sequentially, output signals OUT[1], OUT[2], OUT[3], OUT[4], . . . , OUT[n] to signal lines.

Each of the stages ST1 to STn may include a plurality of terminals through which a plurality of signals are input. The plurality of signals may include a clock signal and a voltage signal. The plurality of terminals may include an input terminal IN, a first voltage input terminal V1, a second voltage input terminal V2, a third voltage input terminal V3, a first clock terminal CK1, a second clock terminal CK2, a first output terminal GOUT, and a second output terminal COUT.

A start signal may be input (supplied) to the input terminal IN. The plurality of stages ST1 to STn may respectively output the output signals OUT[1], OUT[2], OUT[3], OUT[4], . . . , OUT[n] in response to the start signal. The start signal may be an external signal FLM or a carry signal CR[1], CR[2], CR[3], CR[4], . . . , CR[n−1]. The external signal FLM may be input as a start signal to the input terminal IN of the first stage ST1, and a carry signal (hereinafter referred to as "previous carry signal") output by a previous stage may be input as a start signal to the input terminal IN of each of the second to nth stages ST2 to STn. The previous stage may be a stage located at least one before a current stage. FIG. 3 illustrates an example in which the previous stage is a stage located immediately before the current stage. For example, a carry signal CR[3] output from the third stage ST3 may be input as a start signal to the input terminal IN of the fourth stage ST4.

A first voltage VGH may be input to the first voltage input terminal V1, a second voltage VGL may be input to the second voltage input terminal V2, and a third voltage VGL2 may be input to the third voltage input terminal V3. The second voltage VGL may be lower than the first voltage VGH. The third voltage VGL2 may be lower than the second voltage VGL. The third voltage VGL2 may be a voltage that is about 3 V lower than the second voltage VGL, although the disclosure is not limited thereto. A difference between the second voltage VGL and the third voltage VGL2 may be determined according to a threshold voltage variation of the transistor supplied with the third voltage VGL2 as a back-gate voltage. In one or more embodiments, the first voltage VGH may be about 7.5 V, and the second voltage VGL may be about −9 V, although the disclosure is not limited thereto. Hereinafter, the first voltage VGH may be referred to as a high-level voltage, and the second voltage VGL and third voltage VGL2 may be referred to as a low-level voltage.

A first clock signal CLK1 or a second clock signal CLK2 may be input to a respective one of the first clock terminal CK1 and the second clock terminal CK2. The first clock signal CLK1 and the second clock signal CLK2 may be alternately input to the first clock terminals CK1 of the stages ST1 to STn. The second clock signal CLK2 and the first clock signal CLK1 may be alternately input to the second clock terminals CK2 of the stages ST1 to STn. In one or more embodiments, the first clock signal CLK1 and the second clock signal CLK2 may be respectively input to the first clock terminal CK1 and the second clock terminal CK2 of the odd stages ST1, ST3, . . . . The second clock signal CLK2 and the first clock signal CLK1 may be respectively input to the first clock terminal CK1 and the second clock terminal CK2 of the even stages ST2, ST4, . . . . Contrastingly, in one or more embodiments, the second clock signal CLK2 and the first clock signal CLK1 may be input to the first clock terminal CK1 and the second clock terminal CK2 of the odd stages ST1, ST3, . . . , respectively, and the first clock signal CLK1 and the second clock signal CLK2 may be input to the first clock terminal CK1 and the second clock terminal CK2 of the even stages ST2, ST4, . . . , respectively.

As illustrated in FIG. 4, the first clock signal CLK1 and the second clock signal CLK2 may be square wave signals that alternate between a high-level voltage and a low-level voltage. In one or more embodiments, the first clock signal CLK1 and the second clock signal CLK2 may be square wave signals that alternate between the first voltage VGH and the second voltage VGL. The first clock signal CLK1 and the second clock signal CLK2 may be signals that are phase-inverted to each other. In one or more embodiments, as for one of the first clock signal CLK1 or the second clock signal CLK2, a duration in which the high-level voltage is maintained for one cycle may be shorter than a duration in which the low-level voltage is maintained for one cycle, and as for the other one, a duration in which the high-level voltage is maintained for one cycle may be longer than a duration in which the low-level voltage is maintained for one cycle. In one or more embodiments, as for the first clock signal CLK1 and the second clock signal CLK2, a duration in which the high-level voltage is maintained for one cycle may be equal to a duration in which the low-level voltage is maintained for one cycle.

An output signal may be output from the first output terminal GOUT. As illustrated in FIG. 4, the output signals OUT[1], OUT[2], OUT[3], OUT[4], . . . , OUT[n] respectively output from the first output terminals GOUT of the stages ST1 to STn may be sequentially shifted by a corresponding interval. In one or more embodiments, the stages ST1 to STn may sequentially output high-level-voltage output signals OUT[1], OUT[2], OUT[3], OUT[4], . . . , OUT[n] by shifting each of them by ½ cycle of the clock signal.

A carry signal may be output from the second output terminal COUT. As illustrated in FIG. 4, the carry signals CR[1], CR[2], CR[3], CR[4], . . . , CR[n] output from the second output terminals COUT of the stages ST1 to STn may be sequentially shifted by a corresponding interval. In one or more embodiments, the stages ST1 to STn may sequentially output high-level-voltage carry signals CR[1], CR[2], CR[3], CR[4], . . . , CR[n] by shifting each of them by ½ cycle of the clock signal.

A reset signal ESR may be input to a reset terminal RS. A reset signal ESR of a gate-on voltage may be input to a gate of the transistor at a corresponding timing, and a reset signal ESR of a gate-off voltage may be input thereto at the other timings. For example, when power is input to a display apparatus (power on), the reset signal ESR may be input as a gate-on voltage to the stages ST1 to STn for a corresponding time, and may be input as a gate-off voltage to the stages ST1 to STn after lapse of the corresponding time. The reset signal ESR may be input as a gate-off voltage while the stages ST1 to STn operate to generate a gate signal.

Figure 5:
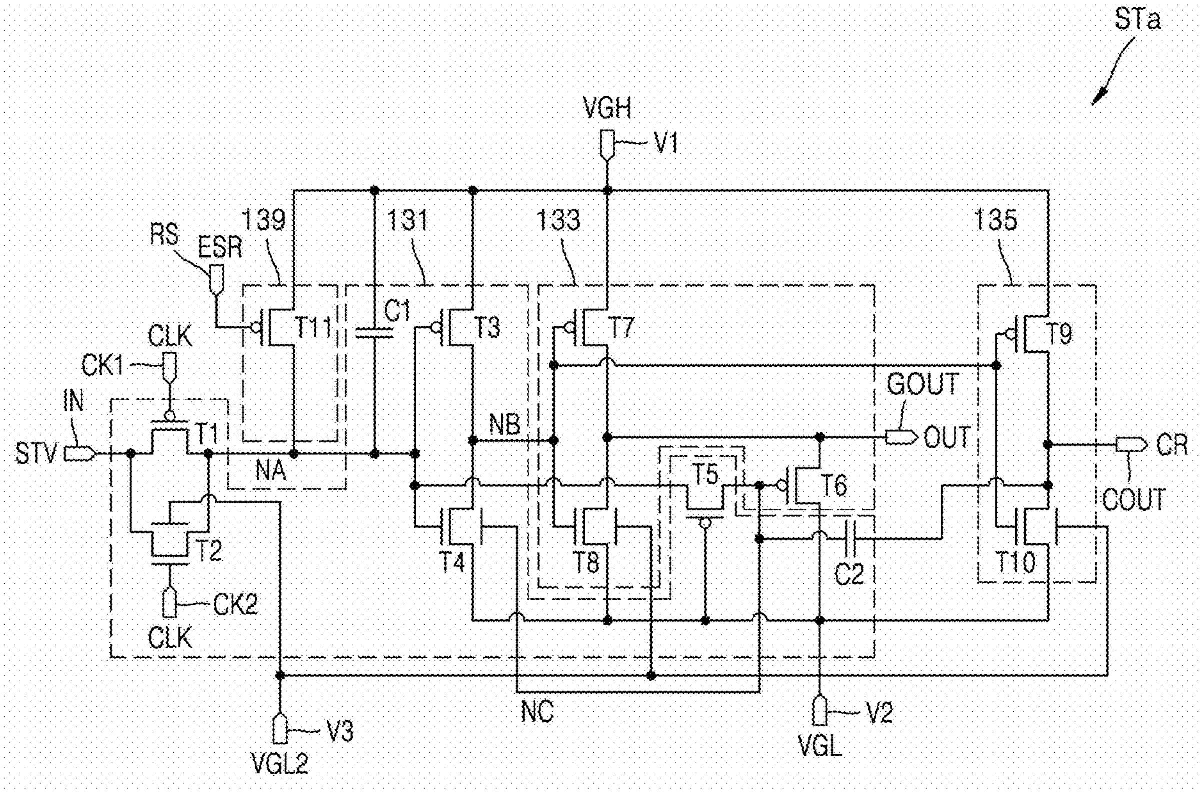
FIG. 5 is a diagram schematically illustrating an example of a stage included in the driving circuit of FIG. 3.
Figure 6:
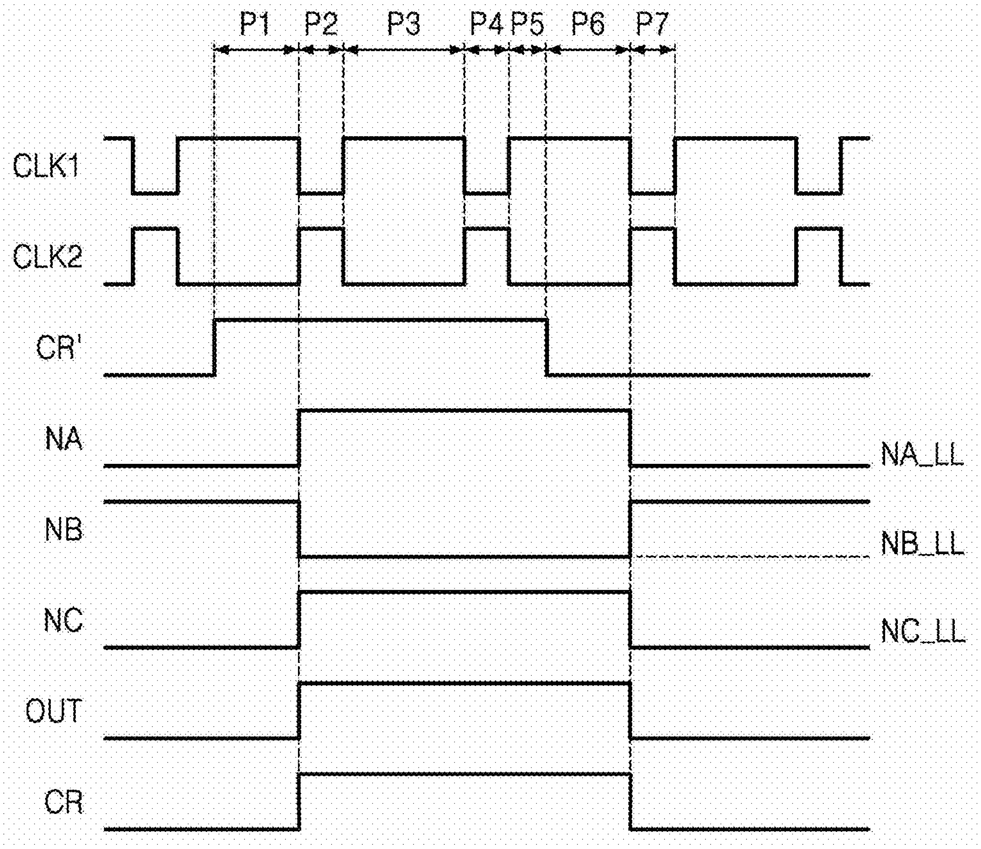
FIG. 6 is a timing diagram for describing the driving of the stage of FIG. 5.

FIG. 5 is a diagram schematically illustrating an example of a stage included in the driving circuit of FIG. 3. FIG. 6 is a timing diagram for describing the driving of the stage of FIG. 5.

Referring to FIG. 5, a stage STa may include a control circuit 131, a first output circuit 133, and a second output circuit 135. The stage STa may further include a reset circuit 139. The stage STa may include a plurality of nodes, and hereinafter, some nodes among the plurality of nodes will be referred to as first to third nodes NA, NB, and NC.

Each of the control circuit 131, the first output circuit 133, and the second output circuit 135 may include at least one transistor. In one or more embodiments, the at least one transistor may include an N-channel transistor and/or a P-channel transistor. In one or more embodiments, the dopant conductivity type of a second transistor T2, a fourth transistor T4, an eighth transistor (e.g., a first pull-down transistor) T8, and a tenth transistor (e.g., a second pull-down transistor) T10 of the stage STa may be opposite to the dopant conductivity type of the other transistors. For example, the second transistor T2, the fourth transistor T4, the eighth transistor T8, and the tenth transistor T10 may be N-channel transistors, and a first transistor T1, a third transistor T3, a fifth transistor T5, a sixth transistor T6, a seventh transistor (e.g., a first pull-up transistor) T7, a ninth transistor (e.g., a second pull-up transistor) T9, and an 11th transistor T11 may be P-channel transistors.

The control circuit 131 may control the voltage of the first node NA and the second node NB in response to a start signal STV input through an input terminal IN. The start signal STV may be an external signal FLM or a carry signal CR (see FIG. 3). The control circuit 131 may include the first to fifth transistors T1 to T5. The control circuit 131 may further include a first capacitor C1 and a second capacitor C2.

The first transistor T1 may be connected between the input terminal IN and the first node NA. A gate of the first transistor T1 may be connected to a first clock terminal CK1. When a clock signal CLK applied to the first clock terminal CK1 is at a low level, the first transistor T1 may be turned on to transmit the start signal STV input through the input terminal IN to the first node NA.

The second transistor T2 may be connected between the input terminal IN and the first node NA. The second transistor T2 may be connected in parallel to the first transistor T1. A gate of the second transistor T2 may be connected to a second clock terminal CK2. When a clock signal CLK applied to the second clock terminal CK2 is at a high level, the second transistor T2 may be turned on to transmit the start signal STV input through the input terminal IN to the first node NA.

When transmitting the start signal STV to the first node NA, the first transistor T1 and the second transistor T2 may mutually compensate for a voltage loss of the start signal STV due to the threshold voltage of the first transistor T1 or the second transistor T2. In one or more embodiments, one of the first transistor T1 and the second transistor T2 may be omitted.

In one or more embodiments, the clock signal CLK input to the gate of the first transistor T1 may be a first clock signal CLK1, and the clock signal CLK input to the gate of the second transistor T2 may be a second clock signal CLK2. In one or more embodiments, the clock signal CLK input to the gate of the first transistor T1 may be a second clock signal CLK2, and the clock signal CLK input to the gate of the second transistor T2 may be a first clock signal CLK1.

The second transistor T2 may be a four-terminal dual-gate transistor further including a back gate connected to a third voltage input terminal V3 configured to supply a third voltage VGL2. The gate of the second transistor T2 may be a top gate located over a semiconductor, and the back gate thereof may be a bottom gate located under the semiconductor. The gate and the back gate may overlap a channel area of the semiconductor. As the third voltage VGL2 is input to the back gate of the second transistor T2, the threshold voltage of the second transistor T2 may be positively shifted.

The third transistor T3 may be connected between a first voltage input terminal V1 and the second node NB. A gate of the third transistor T3 may be connected to the first node NA. When the voltage of the first node NA is at a low level, the third transistor T3 may be turned on to transmit a first voltage VGH input through the first voltage input terminal V1 to the second node NB.

The fourth transistor T4 may be connected between the second node NB and a second voltage input terminal V2. A gate of the fourth transistor T4 may be connected to the first node NA. When the voltage of the first node NA is at a high level, the fourth transistor T4 may be turned on to transmit a second voltage VGL input through the second voltage input terminal V2 to the second node NB.

The fourth transistor T4 may be a four-terminal dual-gate transistor further including a back gate connected to the third node NC. The gate of the fourth transistor T4 may be a top gate located over a semiconductor, and the back gate thereof may be a bottom gate located under the semiconductor. A voltage input to the back gate of the fourth transistor T4 may be an AC voltage alternating between a high-level voltage and a low-level voltage.

In one or more embodiments, a low-level voltage may be applied to the back gate of the fourth transistor T4 while an output signal OUT of a gate-off voltage is output, and a high-level voltage may be applied to the back gate of the fourth transistor T4 while an output signal OUT of a gate-on voltage is output. Accordingly, by positively shifting the threshold voltage of the fourth transistor T4, a decrease in the turn-on current and a decrease in the operation speed of the fourth transistor T4 may be reduced or minimized (e.g., prevented) while an output signal of a gate-on voltage is output.

In one or more embodiments, while the first node NA is at a low level, the voltage of the third node NC may become a low level, and thus the threshold voltage of the fourth transistor T4 may be positively shifted. While the first node NA is at a high level, the voltage of the third node NC may become a high level, and thus the turn-on current of the fourth transistor T4 may increase.

The fifth transistor T5 may be connected between the first node NA and the third node NC. A gate of the fifth transistor T5 may be connected to the second voltage input terminal V2. When the voltage of the first node NA is at a high level, the fifth transistor T5 may be turned on by the second voltage VGL input through the second voltage input terminal V2 to electrically connect the first node NA and the third node NC to each other.

The first capacitor C1 may be connected between the first voltage input terminal V1 and the first node NA. The first capacitor C1 may be configured to stabilize the voltage of the first node NA. The second capacitor C2 may be connected between the third node NC and a second output terminal COUT. The second capacitor C2 may be a capacitor configured to down-bootstrap the voltage of the third node NC.

In one or more embodiments, the fifth transistor T5 and the second capacitor C2 may be an AC voltage generating circuit configured to control the voltage of the third node NC to a high-level voltage or a low-level voltage. The back gate of the fourth transistor T4 may be connected to the third node NC to receive an input of an AC voltage.

The first output circuit 133 may be connected between the first voltage input terminal V1 and the second voltage input terminal V2. The first output circuit 133 may output an output signal OUT of a high-level voltage or a low-level voltage depending on the voltage of the second node NB. The first output circuit 133 may include the sixth transistor T6, the seventh transistor T7, and the eighth transistor T8. The node (e.g., a first output node) between the seventh transistor T7 and the eighth transistor T8 may be a first output terminal GOUT.

The seventh transistor T7 may be connected between the first voltage input terminal V1 and the first output terminal GOUT. A gate of the seventh transistor T7 may be connected to the second node NB. The seventh transistor T7 may be a pull-up transistor configured to transmit a high-level voltage to the first output terminal GOUT. When the voltage of the second node NB is at a low level, the seventh transistor T7 may be turned on to transmit the first voltage VGH input through the first voltage input terminal V1 to the first output terminal GOUT.

The eighth transistor T8 may be connected between the first output terminal GOUT and the second voltage input terminal V2. A gate of the eighth transistor T8 may be connected to the second node NB. The eighth transistor T8 may be a pull-down transistor configured to transmit a low-level voltage to the first output terminal GOUT. When the voltage of the second node NB is at a high level, the eighth transistor T8 may be turned on to transmit the second voltage VGL input through the second voltage input terminal V2 to the first output terminal GOUT.

The eighth transistor T8 may be a four-terminal dual-gate transistor further including a back gate connected to the third voltage input terminal V3 configured to supply the third voltage VGL2. The gate of the eighth transistor T8 may be a top gate located over a semiconductor, and the back gate thereof may be a bottom gate located under the semiconductor. As the third voltage VGL2 is input to the back gate of the eighth transistor T8, the threshold voltage of the eighth transistor T8 may be positively shifted.

The sixth transistor T6 may be connected between the first output terminal GOUT and the second voltage input terminal V2. A gate of the sixth transistor T6 may be connected to the third node NC. The sixth transistor T6 may be a pull-down transistor configured to transmit a low-level voltage to the first output terminal GOUT. When the voltage of the third node NC is at a low level, the sixth transistor T6 may be turned on to transmit the second voltage VGL input through the second voltage input terminal V2 to the first output terminal GOUT.

The second output circuit 135 may be connected between the first voltage input terminal V1 and the second voltage input terminal V2. The second output circuit 135 may output a carry signal CR of a high-level voltage or a low-level voltage depending on the voltage of the second node NB. The second output circuit 135 may include the ninth transistor T9 and the tenth transistor T10. The node (e.g., a second output node) between the ninth transistor T9 and the tenth transistor T10 may be the second output terminal COUT.

The ninth transistor T9 may be connected between the first voltage input terminal V1 and the second output terminal COUT. A gate of the ninth transistor T9 may be connected to the second node NB. The ninth transistor T9 may be a pull-up transistor configured to transmit a high-level voltage to the second output terminal COUT. When the voltage of the second node NB is at a low level, the ninth transistor T9 may be turned on to transmit the first voltage VGH input through the first voltage input terminal V1 to the second output terminal COUT.

The tenth transistor T10 may be connected between the second output terminal COUT and the second voltage input terminal V2. A gate of the tenth transistor T10 may be connected to the second node NB. The tenth transistor T10 may be a pull-down transistor configured to transmit a low-level voltage to the second output terminal COUT. When the voltage of the second node NB is at a high level, the tenth transistor T10 may be turned on to transmit the second voltage VGL input through the second voltage input terminal V2 to the second output terminal COUT.

The tenth transistor T10 may be a four-terminal dual-gate transistor further including a back gate connected to the third voltage input terminal V3 configured to supply the third voltage VGL2. The gate of the tenth transistor T10 may be a top gate located over a semiconductor, and the back gate thereof may be a bottom gate located under the semiconductor. As the third voltage VGL2 is input to the back gate of the tenth transistor T10, the threshold voltage of the tenth transistor T10 may be positively shifted.

The reset circuit 139 may reset the first node NA based on a reset signal ESR supplied to a reset terminal RS. The reset circuit 139 may include the 11th transistor T11 (reset transistor). The 11th transistor T11 may be connected between the first voltage input terminal V1 and the first node NA. A gate of the 11th transistor T11 may be connected to the reset terminal RS. When a low-level reset signal ESR is applied to the reset terminal RS, the 11th transistor T11 may be turned on to set the voltage of the first node NA to the first voltage VGH.

Hereinafter, the operation of the stage illustrated in FIG. 5 will be described with reference to FIG. 6. For convenience of description, an example in which the stage STa (current stage) of FIG. 5 is an odd stage, in which the first clock signal CLK1 is input to the first clock terminal CK1, and in which the second clock signal CLK2 is input to the second clock terminal CK2 will be described. An even stage may be different from the odd stage only in that the second clock signal CLK2 is input to the first clock terminal CK1 and the first clock signal CLK1 is input to the second clock terminal CK2, and the configuration and operation of the even stage may be substantially the same as the configuration and operation of the odd stage. A start signal STV of the first stage (e.g., first stage ST1) may be an external signal FLM, and a start signal STV of the second and subsequent stages may be a carry signal (a previous carry signal CR') output by the previous stage. FIG. 6 is a timing diagram of an example in which the stage STa of FIG. 5 is a stage among the odd stages subsequent to the second stage.

In a first section P1, a high-level previous carry signal CR' may be input to the input terminal IN, a high-level first clock signal CLK1 may be input to the first clock terminal CK1, and a low-level second clock signal CLK2 may be input to the second clock terminal CK2.

Because the first transistor T1 is turned off by the high-level first clock signal CLK1, and because the second transistor T2 is turned off by the low-level second clock signal CLK2, the voltage of the first node NA may maintain the low level, and the voltage of the second node NB may maintain the high level, as in the previous section. The second voltage VGL may be transmitted to the first output terminal GOUT by the turned-on eighth transistor T8, and the second voltage VGL may be transmitted to the second output terminal COUT by the turned-on tenth transistor T10. Accordingly, a low-level output signal OUT and a low-level carry signal CR may be output.

Moreover, because the voltage of the first node NA is at a low level, the fifth transistor T5 may be turned off, and the voltage of the third node NC may maintain a voltage that is lower than the second voltage VGL by coupling of the second capacitor C2. In the first section P1, a low-level voltage of the first node NA (e.g., equal to about 1 the second voltage VGL) may be applied to the gate of the fourth transistor T4, and a low-level voltage of the third node NC that is lower than the second voltage VGL may be applied to the back gate of the fourth transistor T4. Because the voltage of the third node NC is at a low level, the sixth transistor T6 may be turned on, and the second voltage VGL may be transmitted to the first output terminal GOUT by the turned-on sixth transistor T6. Even when a defect occurs in the eighth transistor T8, a stable low-level output signal OUT may be possible due to the sixth transistor T6.

A low-level voltage NC_LL of the third node NC may be lower than a low-level voltage NA_LL of the first node NA, and may be lower than a low-level voltage NB_LL of the second node NB.

In a second section P2, a high-level previous carry signal CR' may be input to the input terminal IN, a low-level first clock signal CLK1 may be input to the first clock terminal CK1, and a high-level second clock signal CLK2 may be input to the second clock terminal CK2.

The first transistor T1 may be turned on by the low-level first clock signal CLK1, and the second transistor T2 may be turned on by the high-level second clock signal CLK2. The high-level previous carry signal CR' may be transmitted to the first node NA by the turned-on first transistor T1 and second transistor T2. Because the voltage of the first node NA is at a high level, the third transistor T3 may be turned off and the fourth transistor T4 may be turned on. A low-level second voltage VGL may be transmitted to the second node NB by the turned-on fourth transistor T4.

Because the voltage of the second node NB is at a low level, the seventh transistor T7 and the ninth transistor T9 may be turned on, and the eighth transistor T8 and the tenth transistor T10 may be turned off. The first voltage VGH may be transmitted to the first output terminal GOUT by the turned-on seventh transistor T7, and a high-level output signal OUT may be output. The first voltage VGH may be transmitted to the second output terminal COUT by the turned-on ninth transistor T9, and a high-level carry signal CR may be output.

In a third section P3, a high-level previous carry signal CR' may be input to the input terminal IN, a high-level first clock signal CLK1 may be input to the first clock terminal CK1, and a low-level second clock signal CLK2 may be input to the second clock terminal CK2.

Because the first transistor T1 is turned off by the high-level first clock signal CLK1, and because the second transistor T2 is turned off by the low-level second clock signal CLK2, the voltage of the first node NA may maintain the high level, and the voltage of the second node NB may maintain the low level, as in the previous section. A high-level output signal OUT and a high-level carry signal CR may be output by the turned-on seventh transistor T7 and ninth transistor T9.

In a fourth section P4, a high-level previous carry signal CR' may be input to the input terminal IN, a low-level first clock signal CLK1 may be input to the first clock terminal CK1, and a high-level second clock signal CLK2 may be input to the second clock terminal CK2.

The first transistor T1 may be turned on by the low-level first clock signal CLK1, and the second transistor T2 may be turned on by the high-level second clock signal CLK2. The high-level previous carry signal CR' may be transmitted to the first node NA by the turned-on first transistor T1 and second transistor T2. The operation of the stage STa in the fourth section P4 thereafter may be the same as the operation of the stage STa in the second section P2. That is, a high-level output signal OUT and a high-level carry signal CR may be output by the turned-on seventh transistor T7 and ninth transistor T9.

In a fifth section P5, a high-level previous carry signal CR' may be input to the input terminal IN, a high-level first clock signal CLK1 may be input to the first clock terminal CK1, and a low-level second clock signal CLK2 may be input to the second clock terminal CK2. The operation of the stage STa in the fifth section P5 may be the same as the operation of the stage STa in the third section P3. That is, a high-level output signal OUT and a high-level carry signal CR may be output by the turned-on seventh transistor T7 and ninth transistor T9.

In a sixth section P6, a low-level previous carry signal CR' may be input to the input terminal IN, a high-level first clock signal CLK1 may be input to the first clock terminal CK1, and a low-level second clock signal CLK2 may be input to the second clock terminal CK2.

Because the first transistor T1 is turned off by the high-level first clock signal CLK1, and because the second transistor T2 is turned off by the low-level second clock signal CLK2, the voltage of the first node NA may maintain the high level, and the voltage of the second node NB may maintain the low level, as in the previous section, regardless of the voltage level of the previous carry signal CR'. A high-level output signal OUT and a high-level carry signal CR may be output by the turned-on seventh transistor T7 and ninth transistor T9.

Moreover, during the second section P2 to the sixth section P6, because the voltage of the first node NA is at a high level, the fifth transistor T5 may be turned on, and the voltage of the third node NC may be at a high level that is similar to the high level of the voltage of the first node NA. During the second section P2 to the sixth section P6, a high-level voltage of the first node NA may be applied to the gate of the fourth transistor T4, and a high-level voltage of the third node NC may be applied to the back gate of the fourth transistor T4. During the second section P2 to the sixth section P6, because the voltage of the third node NC is at a high level, the sixth transistor T6 may be turned off.

In a seventh section P7, a low-level previous carry signal CR' may be input to the input terminal IN, a low-level first clock signal CLK1 may be input to the first clock terminal CK1, and a high-level second clock signal CLK2 may be input to the second clock terminal CK2.

The first transistor T1 may be turned on by the low-level first clock signal CLK1, and the second transistor T2 may be turned on by the high-level second clock signal CLK2. The low-level previous carry signal CR' may be transmitted to the first node NA by the turned-on first transistor T1 and second transistor T2. Because the voltage of the first node NA is at a low level, the third transistor T3 may be turned on, and the fourth transistor T4 may be turned off. A high-level first voltage VGH may be transmitted to the second node NB by the turned-on third transistor T3.

Because the voltage of the second node NB is at a high level, the seventh transistor T7 and the ninth transistor T9 may be turned off, and the eighth transistor T8 and the tenth transistor T10 may be turned on. The second voltage VGL may be transmitted to the first output terminal GOUT by the turned-on eighth transistor T8, and a low-level output signal OUT may be output. The second voltage VGL may be transmitted to the second output terminal COUT by the turned-on tenth transistor T10, and a low-level carry signal CR may be output.

As the voltage of the first node NA changes from the high level to the low level, the fifth transistor T5 may gradually switch from the turn-on state to the turn-off state. Accordingly, the voltage of the third node NC may fall from the high level to the low level. When the carry signal CR falls from the high level to the low level in a state where the fifth transistor T5 is turned off, the third node NC may be down-bootstrapped by the coupling of the second capacitor C2, and thus the voltage of the third node NC may further fall. In this case, the voltage of the third node NC may be determined by the size (capacity) of the second capacitor C2. In one or more embodiments, in the seventh section P7, the voltage of the third node NC may be lower than the second voltage VGL. In one or more embodiments, in the seventh section P7, the voltage level of the third node NC may be similar to about the voltage level of the third voltage VGL2.

After the seventh section P7, because a low-level previous carry signal CR' is input to the input terminal IN, even when the low-level and high-level first clock signal CLK1 and second clock signal CLK2 are alternately input, the voltage of the first node NA may remain at a low level and the voltage of the second node NB may be at a high level. After the seventh section P7, because the voltage of the third node NC is a low-level voltage that is lower than the second voltage VGL, a voltage of the first node NA that is equal to about the second voltage VGL may be applied to the gate of the fourth transistor T4, and a low-level voltage of the third node NC that is lower than the second voltage VGL may be applied to the back gate thereof.

Figure 7:
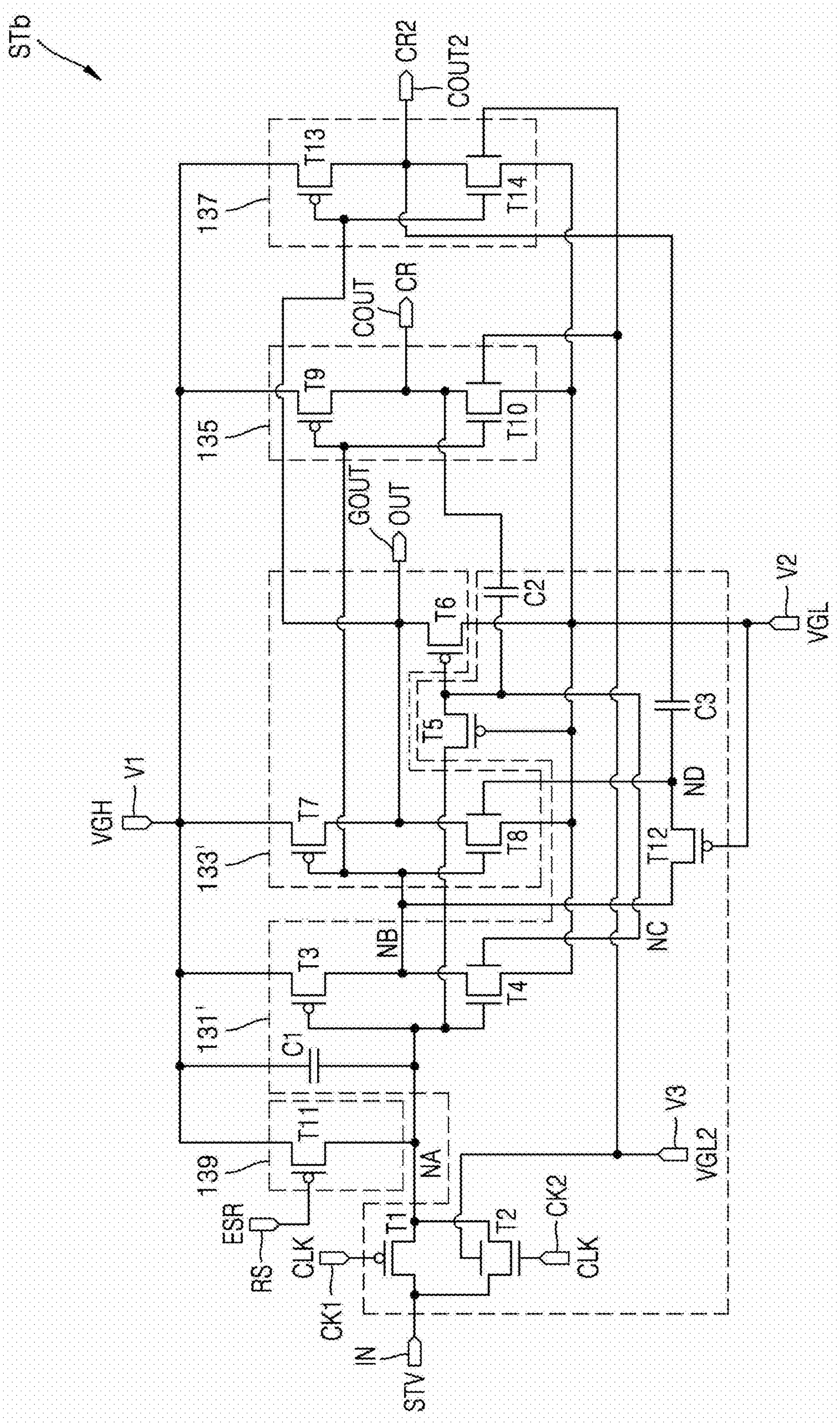
FIG. 7 is a diagram schematically illustrating an example of a stage included in the driving circuit of FIG. 3.
Figure 8:
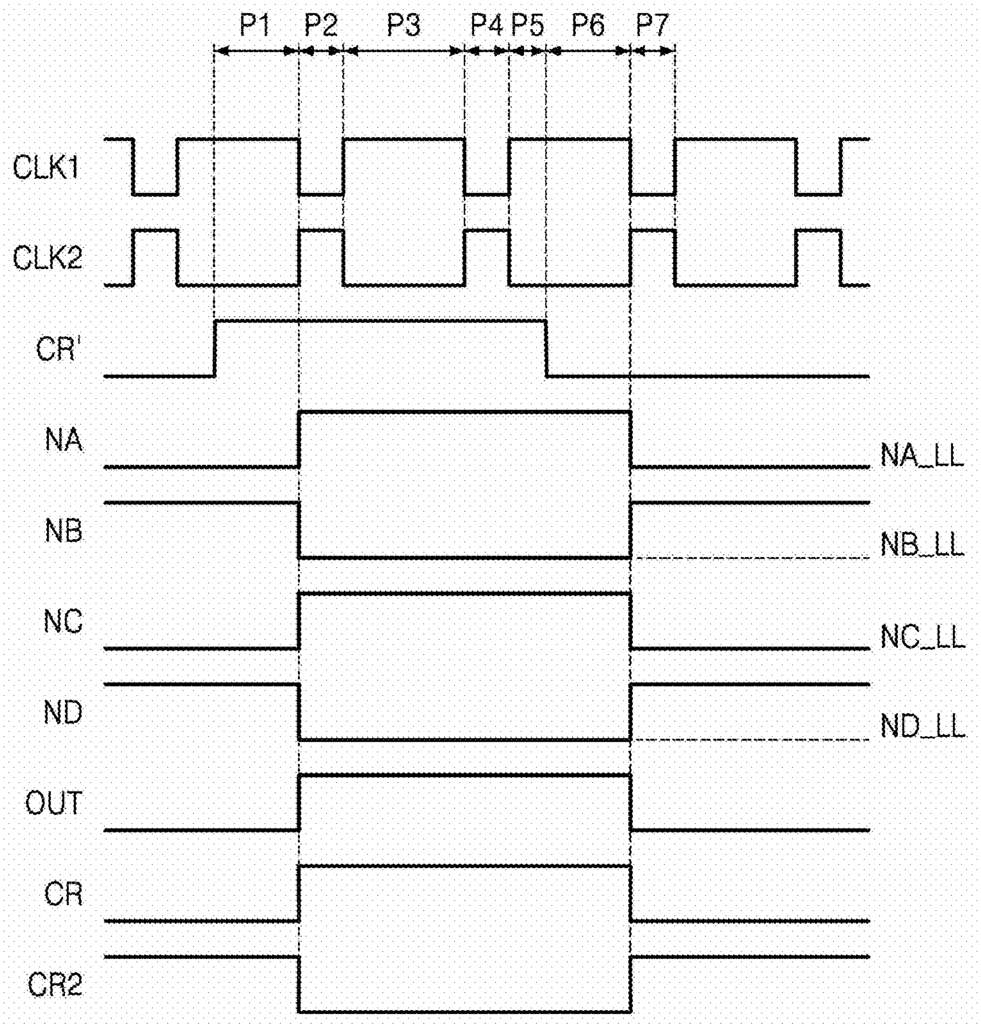
FIG. 8 is a timing diagram for describing the driving of the stage of FIG. 7.

FIG. 7 is a diagram schematically illustrating an example of a stage included in the driving circuit of FIG. 3. FIG. 8 is a timing diagram for describing the driving of the stage of FIG. 7.

A stage STb illustrated in FIG. 7 may include a control circuit 131', a first output circuit 133', a second output circuit 135, and a third output circuit 137. The stage STb may further include a reset circuit 139. The stage STb may include a plurality of nodes, and hereinafter, some nodes among the plurality of nodes will be referred to as first to fourth nodes NA, NB, NC, and ND. Hereinafter, differences from the stage STa illustrated in FIG. 5 will be mainly described, and redundant descriptions thereof will be omitted for conciseness.

The control circuit 131' of the stage STb illustrated in FIG. 7 may further include a 12th transistor T12 and a third capacitor C3, as compared to the control circuit 131 of the stage STa illustrated in FIG. 5. The control circuit 131' may include first to fifth transistors T1 to T5 and a 12th transistor T12. The control circuit 131' may further include a first capacitor C1, a second capacitor C2, and a third capacitor C3.

The 12th transistor T12 may be connected between the second node NB and the fourth node ND. A gate of the 12th transistor T12 may be connected to the second voltage input terminal V2. When the voltage of the second node NB is at a high level, the 12th transistor T12 may be turned on by the second voltage VGL input through the second voltage input terminal V2 to electrically connect the second node NB and the fourth node ND to each other. The 12th transistor T12 may be a P-channel transistor.

The third capacitor C3 may be connected between the fourth node ND and a third output terminal COUT2. The third capacitor C3 may be a capacitor configured to down-bootstrap the voltage of the fourth node ND to a lower voltage.

In one or more embodiments, the 12th transistor T12 and the third capacitor C3 may be an AC voltage generating circuit configured to control the voltage of the fourth node ND to a high-level voltage or a low-level voltage. The back gate of the eighth transistor T8 may be connected to the fourth node ND to receive an application of an AC voltage.

The first output circuit 133' of the stage STb illustrated in FIG. 7 may have a different back gate connection of the eighth transistor T8, as compared to the first output circuit 133 of the stage STa illustrated in FIG. 5. The first output circuit 133' may include the seventh transistor T7 and the eighth transistor T8. The back gate of the eighth transistor T8 may be connected to the fourth node ND. A voltage input to the back gate of the eighth transistor T8 may be an AC voltage alternating between a high-level voltage and a low-level voltage.

The second output circuit 135 may include the ninth transistor T9 and the tenth transistor T10.

The stage STb illustrated in FIG. 7 may be different from the stage STa illustrated in FIG. 5 in that it further includes the third output circuit 137. The third output circuit 137 may be connected between the first voltage input terminal V1 and the second voltage input terminal V2. The third output circuit 137 may output a second carry signal CR2 of a high-level voltage or a low-level voltage depending on the voltage of the first output terminal GOUT. In one or more embodiments, the second carry signal CR2 may be an inverted signal of the carry signal CR. In one or more embodiments, the second carry signal CR2 may not be transmitted to a previous stage and/or a subsequent stage. The second carry signal CR2 may be a dummy signal that does not affect an adjacent stage and/or a pixel PX (see FIG. 9).

The third output circuit 137 may include a 13th transistor (e.g., third pull-up transistor) T13 and a 14th transistor (e.g., third pull-down transistor) T14. The 13th transistor T13 may be a P-channel transistor, and the 14th transistor T14 may be an N-channel transistor. The node (e.g. a third output node) between the 13th transistor T13 and the 14th transistor T14 may be the third output terminal COUT2. The third output circuit 137 may be a circuit for connecting a capacitor that bootstraps the voltage of the fourth node ND to a voltage that is lower than the second voltage VGL.

The 13th transistor T13 may be connected between the first voltage input terminal V1 and the third output terminal COUT2. A gate of the 13th transistor T13 may be connected to the first output terminal GOUT. The 13th transistor T13 may be a pull-up transistor configured to transmit a high-level voltage to the third output terminal COUT2. When the voltage of the first output terminal GOUT is at a low level, the 13th transistor T13 may be turned on to transmit a first voltage VGH input through the first voltage input terminal V1 to the third output terminal COUT2.

The 14th transistor T14 may be connected between the third output terminal COUT2 and the second voltage input terminal V2. A gate of the 14th transistor T14 may be connected to the first output terminal GOUT. The 14th transistor T14 may be a pull-down transistor configured to transmit a low-level voltage to the third output terminal COUT2. When the voltage of the first output terminal GOUT is at a high level, the 14th transistor T14 may be turned on to transmit a second voltage VGL input through the second voltage input terminal V2 to the third output terminal COUT2.

The 14th transistor T14 may be a four-terminal dual-gate transistor further including a back gate connected to a third voltage input terminal V3 configured to supply a third voltage VGL2. The gate of the 14th transistor T14 may be a top gate located over a semiconductor, and the back gate thereof may be a bottom gate located under the semiconductor.

FIG. 8 is a timing diagram in which the voltage of the fourth node ND and the second carry signal CR2 are added to the timing diagram illustrated in FIG. 6.

In a first section P1, because the voltage of the second node NB is at a high level, the 12th transistor T12 may be turned on, and the voltage of the fourth node ND may be at a high level that is similar to the high level of the voltage of the second node NB. In the first section P1, a high-level voltage of the second node NB may be applied to the gate of the eighth transistor T8, and a high-level voltage of the fourth node ND may be applied to the back gate thereof.

In a second section P2, as the voltage of the second node NB changes from the high level to the low level, the 12th transistor T12 may gradually switch from the turn-on state to the turn-off state. Accordingly, the voltage of the fourth node ND may fall from the high level to the low level. When the second carry signal CR2 falls from the high level to the low level in a state where the 12th transistor T12 is turned off, the fourth node ND may be down-bootstrapped by the coupling of the third capacitor C3, and thus the voltage of the fourth node ND may further fall. In one or more embodiments, in the second section P2, the voltage of the fourth node ND may be lower than the second voltage VGL.

During a third section P3 to a sixth section P6, because the voltage of the second node NB is at a low level, the 12th transistor T12 may be turned off, and the voltage of the fourth node ND may maintain a low level that is lower than the low level of the second voltage VGL.

In the second section P2, a low-level voltage of the second node NB (about the second voltage VGL) may be applied to the gate of the eighth transistor T8, and a low-level voltage of the fourth node ND that is lower than the second voltage VGL may be applied to the back gate thereof.

During and after a seventh section P7, because the voltage of the second node NB is at a high level, the 12th transistor T12 may be turned on, and the voltage of the fourth node ND may be at a high level similar to the high level of the voltage of the second node NB. During and after the seventh section P7, a high-level voltage of the second node NB may be applied to the gate of the eighth transistor T8, and a high-level voltage of the fourth node ND may be applied to the back gate thereof.

A low-level voltage NC_LL of the third node NC and a low-level voltage ND_LL of the fourth node ND may be lower than a low-level voltage NA_LL of the first node NA and may be lower than a low-level voltage NB_LL of the second node NB. The low-level voltage NC_LL of the third node NC and the low-level voltage ND_LL of the fourth node ND may be determined according to the size (capacity) of the second capacitor C2 and the size (capacity) of the third capacitor C3.

Figure 9:
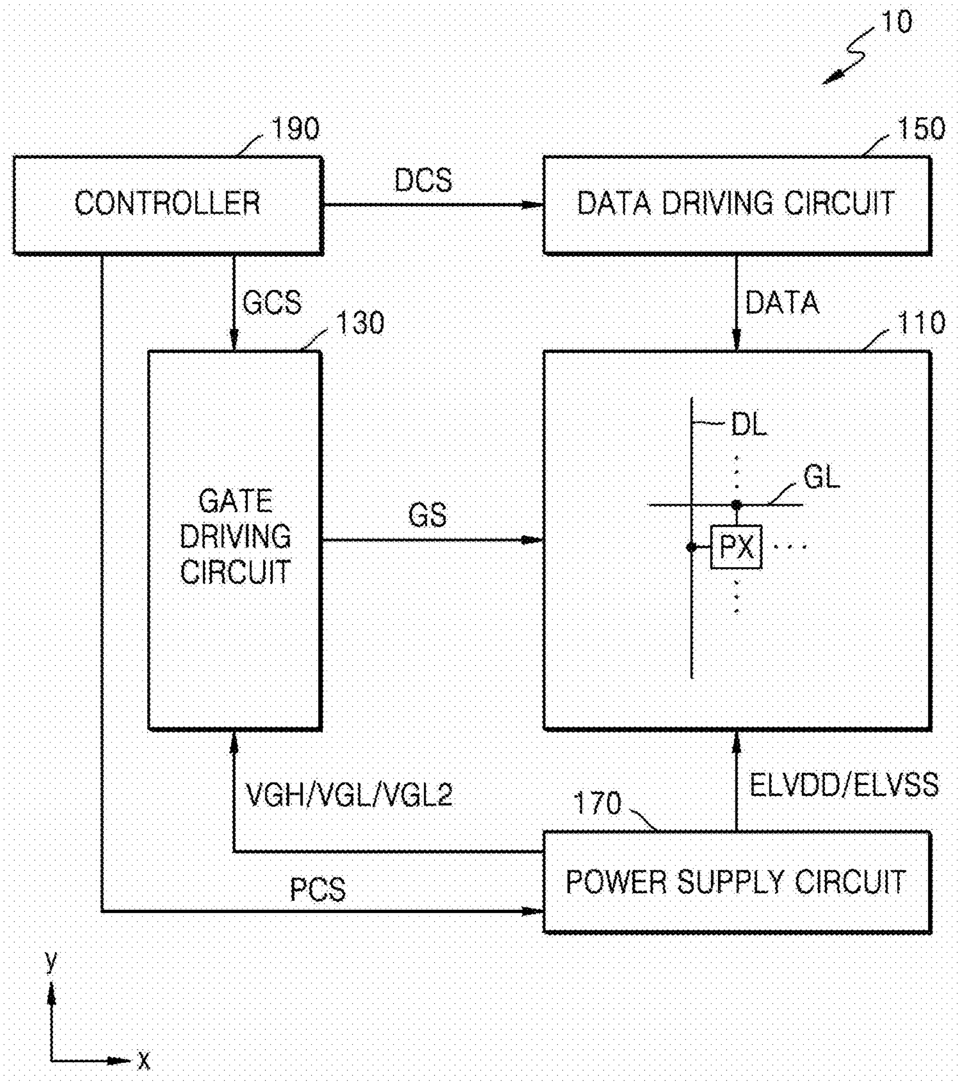
FIG. 9 is a diagram schematically illustrating a display apparatus according to one or more embodiments.

FIG. 9 is a diagram schematically illustrating a display apparatus according to one or more embodiments.

A display apparatus 10 according to one or more embodiments may be a display apparatus, such as an organic light-emitting display apparatus, an inorganic light-emitting display apparatus (or inorganic EL display apparatus), or a quantum dot light-emitting display apparatus.

Referring to FIG. 9, the display apparatus 10 according to one or more embodiments may include a pixel area 110, a gate-driving circuit 130, a data-driving circuit 150, a power supply circuit 170, and a controller 190.

The pixel area 110 may correspond to a display area that displays an image. Various conductive lines for transmitting electrical signals to be applied to the display area, peripheral driving circuits electrically connected to pixel circuits, and/or pads to which a printed circuit board or a driver IC chip is attached, may be located in a peripheral area (non-display area) outside the display area. For example, the gate-driving circuit 130, the data-driving circuit 150, the power supply circuit 170, and the controller 190 may be provided in the peripheral area.

A plurality of gate lines GL, a plurality of data lines DL, and a plurality of pixels PX connected thereto may be arranged in the pixel area 110. The plurality of pixels PX may be repeatedly arranged in a first direction (x direction or row direction) and a second direction (y direction or column direction). The plurality of pixels PX may be arranged in various forms, such as stripe arrangement, pentile arrangement, diamond arrangement, and mosaic arrangement to implement an image. Each of the plurality of pixels PX may include an organic light-emitting diode as a display element, and the organic light-emitting diode may be connected to a pixel circuit. The pixel circuit may include a plurality of transistors and at least one capacitor. The pixel PX may emit, for example, red, green, blue, or white light from the organic light-emitting diode. Each pixel PX may be connected to at least one corresponding gate line among the plurality of gate lines GL and a corresponding data line among the plurality of data lines DL.

In one or more embodiments, the plurality of transistors included in the pixel circuit may be P-channel silicon transistors. In one or more embodiments, the plurality of transistors included in the pixel circuit may be N-channel oxide transistors. In one or more embodiments, some of the plurality of transistors included in the pixel circuit may be P-channel silicon transistors, and some others thereof may be N-channel oxide transistors.

Each of the gate lines GL may extend in the x direction (row direction) to be connected to the pixels PX located in the same row. Each of the gate lines GL may be configured to transmit a gate signal to the pixels PX in the same row. Each of the data lines DL may extend in the y direction (column direction) to be connected to the pixels PX located in the same column. Each of the data lines DL may be configured to transmit a data signal to each of the pixels PX in the same column in synchronization with a gate signal.

The gate-driving circuit 130 may be connected to a plurality of gate lines GL, may generate a gate signal GS in response to a gate-driving control signal GCS from the controller 190, and may sequentially supply the gate signal GS to the gate lines GL. The gate line GL may be connected to a gate of the transistor included in the pixel PX, and the gate signal GS may be a gate control signal for controlling the turn-on and turn-off of a transistor to which a gate line GL is connected. The gate signal GS may include a gate-on voltage at which the transistor may be turned on, and a gate-off voltage at which the transistor may be turned off. The gate-driving circuit 130 may include a plurality of stages that sequentially generate and output the gate signal GS.

In one or more embodiments, the gate-driving circuit 130 may be implemented as the driving circuit DRV illustrated in FIG. 3. For example, the gate signal GS output by the gate-driving circuit 130 to each gate line GL may correspond to the high-level output signal OUT output by each of the plurality of stages ST1 to STn of the driving circuit DRV to the signal line. Each of the stages ST1 to STn may be connected to a gate line GL arranged in a corresponding row of the pixel area 110. Each of the stages ST1 to STn may generate a gate signal GS as an output signal OUT, and may output the gate signal GS to the connected gate line GL. That is, each of the stages ST1 to STn may supply a high-level gate signal GS to the gate line GL arranged in the corresponding row. In one or more embodiments, each of the stages ST1 to STn of the gate-driving circuit 130 may be the stage STa illustrated in FIG. 5 or the stage STb illustrated in FIG. 7.

The number of stages constituting the gate-driving circuit 130 according to one or more embodiments may vary depending on the number of rows (horizontal lines) arranged in the pixel area 110.

The data-driving circuit 150 may be connected to a plurality of data lines DL, and may supply a data signal DATA to the data lines DL in response to a data-driving control signal DCS from the controller 190. The data signal DATA supplied to the data lines DL may be supplied to the pixels PX to which the gate signal GS is supplied. The data-driving circuit 150 may convert input image data, with gradation input from the controller 190, into a data signal DATA in the form of a voltage or current.

The power supply circuit 170 may generate signals (voltage and current) suitable for driving the pixels PX of the pixel area 110 in response to a power-driving control signal PCS from the controller 190. When the display apparatus 10 is an organic light-emitting display apparatus, the power supply circuit 170 may generate a first power voltage ELVDD and a second power voltage ELVSS, and may supply the same to the pixels PX. The first power voltage ELVDD may be a high-level voltage provided to one terminal of a driving transistor connected to a first electrode (e.g., pixel electrode or anode) of an organic light-emitting diode included in the pixel PX. The second power voltage ELVSS may be a low-level voltage provided to a second electrode (e.g., opposite electrode or cathode) of the organic light-emitting diode. The first power voltage ELVDD and the second power voltage ELVSS may be driving voltages for emitting light of the plurality of pixels PX.

The power supply circuit 170 may generate a first voltage VGH, a second voltage VGL, and a third voltage VGL2, and may supply the same to the gate-driving circuit 130. The power supply circuit 170 may generate a plurality of clock signals CLK1 and CLK2 (see FIG. 3) and an external signal FLM (see FIG. 3), and may supply the same to the gate-driving circuit 130.

The controller 190 may generate a gate-driving control signal GCS, a data-driving control signal DCS, and a power-driving control signal PCS based on the signals input from the outside. The controller 190 may supply the gate-driving control signal GCS to the gate-driving circuit 130, may supply the data-driving control signal DCS to the data-driving circuit 150, and may supply the power-driving control signal PCS to the power supply circuit 170.

The display apparatus 10 of FIG. 9 independently includes the power supply circuit 170 and the controller 190, although the disclosure is not limited thereto. In one or more embodiments, the power supply circuit 170 may be included in the controller 190.

The display apparatus 10 may include a display panel, and the display panel may include a substrate. Pixels PX may be arranged in a display area of the substrate. A portion or all of the gate-driving circuit 130 may be directly formed in a peripheral area of the substrate in the process of forming transistors constituting a pixel circuit in the display area of the substrate. Each of the data-driving circuit 150, the power supply circuit 170, and the controller 190 may be formed in the form of a separate integrated circuit chip or a single integrated circuit chip, and may be located over a flexible printed circuit board (FPCB) that is electrically connected to a pad arranged on one side of the substrate. In other embodiments, the data-driving circuit 150, the power supply circuit 170, and the controller 190 may be directly located over the substrate by using a chip-on-glass (COG) or chip-on-plastic (COP) method.

Embodiments are not limited to the stages described above, and may be applied to stages including at least one N-channel oxide transistor.

In embodiments, at least one N-channel oxide transistor included in the stage may be a fourth-terminal dual-gate transistor. A voltage applied to a back gate of the N-channel oxide transistor may be an AC voltage. In one or more embodiments, the voltage applied to the back gate of the N-channel oxide transistor may be a high-level voltage in some sections of the frame, and may be a low-level voltage in some other sections of the frame.

For example, when a high-level voltage is applied to a gate of an N-channel oxide transistor, the same high-level voltage may be applied to the back gate thereof. When a low-level voltage is applied to the gate of an N-channel oxide transistor, a low-level voltage that is lower than the voltage applied to the gate may be applied to the back gate thereof.

The back gate of the N-channel oxide transistor may be connected to an AC voltage generating circuit. The AC voltage generating circuit may include a transistor (control transistor) and a capacitor (bootstrap capacitor), and the back gate of the N-channel oxide transistor may be connected to the node (control node) between the transistor and the capacitor. The capacitor of the AC voltage generating circuit may be connected between the control node and a terminal whose voltage level changes (e.g., the first output terminal GOUT, the second output terminal COUT, or the third output terminal COUT2), and the transistor may be turned off while the control node is bootstrapped.

In one or more embodiments, when the stage includes a plurality of N-channel oxide transistors, a carry output circuit and an AC voltage generating circuit connected thereto may be added therein. The AC voltage generating circuit may include at least one control node whose voltage level changes during the frame, and the back gate of the N-channel oxide transistor may be connected to the control node.

According to embodiments, by applying an AC voltage to a back gate of an oxide transistor by using a node in a stage, because a separate external circuit for generating an AC voltage is not necessary, a driving circuit capable of stably outputting an output signal without increasing the area of a peripheral area, and a display apparatus including the driving circuit, may be provided.

According to one or more embodiments, a driving circuit capable of stably outputting a gate signal at low power while reducing the area of a non-display area, and a display apparatus including the driving circuit, may be provided. The aspects of the disclosure are not limited to the above aspects and may be variously extended without departing from the spirit of the disclosure.

It should be understood that embodiments described herein should be considered in a descriptive sense only and not for purposes of limitation. Descriptions of aspects within each embodiment should typically be considered as available for other similar aspects in other embodiments. While one or more embodiments have been described with reference to the figures, it will be understood by those of ordinary skill in the art that various changes in form and details may be made therein without departing from the spirit and scope as defined by the following claims, with functional equivalents thereof to be included therein.

What is claimed is:

1. A driving circuit comprising stages, the stages comprising:

a first output circuit configured to output an output signal, and comprising a seventh transistor and an eighth transistor electrically connected between a first voltage input terminal for receiving a first voltage and a second voltage input terminal for receiving a second voltage that is lower than the first voltage;

a second output circuit configured to output a carry signal, and comprising a ninth transistor and a tenth transistor electrically connected between the first voltage input terminal and the second voltage input terminal; and a control circuit electrically connected to the first output circuit, to the second output circuit, and to an input terminal configured to receive a start signal, and comprising:

a fourth transistor comprising a gate electrically connected to a first node configured to receive the start signal and a back gate electrically connected to a third node, and electrically connected between the second voltage input terminal and a second node to which a gate of the eighth transistor is electrically connected;

a fifth transistor electrically connected between the first node and the third node, and comprising a gate electrically connected to the second voltage input terminal; and a second capacitor electrically connected to the third node and to a second output node between the ninth transistor and the tenth transistor.

2. The driving circuit of claim 1, wherein, when a voltage of the first node is at a high level, a voltage of the third node is at a high level that is substantially equal to the high level of the voltage of the first node, and wherein, when the voltage of the first node is at a low level, the voltage of the third node is at a low level that is lower than the low level of the voltage of the first node.

3. The driving circuit of claim 1, wherein the fourth transistor comprises an N-channel transistor, and the fifth transistor comprises a P-channel transistor.

4. The driving circuit of claim 3, wherein the fourth transistor comprises an oxide transistor, and the fifth transistor comprises a silicon transistor.

5. The driving circuit of claim 3, wherein the first output circuit further comprises a sixth transistor electrically connected between the second voltage input terminal and a first output node between the seventh transistor and the eighth transistor, and comprising a gate electrically connected to the third node.

6. The driving circuit of claim 1, wherein the control circuit further comprises:

a first transistor electrically connected between the input terminal and the first node, and comprising a gate electrically connected to a first clock terminal configured to receive a first clock signal; and a second transistor electrically connected between the input terminal and the first node, and comprising a gate electrically connected to a second clock terminal configured to receive a second clock signal.

7. The driving circuit of claim 6, wherein the second transistor further comprises a back gate electrically connected to a third terminal configured to receive a third voltage that is lower than the second voltage.

8. The driving circuit of claim 6, wherein the second clock signal is an inverted signal of the first clock signal.

9. The driving circuit of claim 6, wherein the control circuit further comprises a third transistor electrically connected between the first voltage input terminal and the second node, and comprising a gate electrically connected to the first node.

10. The driving circuit of claim 1, wherein the eighth transistor comprises a back gate electrically connected to a third terminal configured to receive a third voltage that is lower than the second voltage.

11. The driving circuit of claim 1, wherein the tenth transistor comprises a back gate electrically connected to a third terminal configured to receive a third voltage that is lower than the second voltage.

12. The driving circuit of claim 1, further comprising a third output circuit comprising a thirteenth transistor and a fourteenth transistor electrically connected between the first voltage input terminal and the second voltage input terminal, and configured to output a second carry signal, wherein, when the carry signal is at a high level, the second carry signal is at a low level, and wherein, when the carry signal is at a low level, the second carry signal is at a high level.

13. The driving circuit of claim 12, wherein the control circuit further comprises:

a twelfth transistor electrically connected between the second node and a fourth node, and comprising a gate electrically connected to the second voltage input terminal; and a third capacitor electrically connected to the fourth node and to a third output node between the thirteenth transistor and the fourteenth transistor, wherein the eighth transistor comprises a back gate electrically connected to the fourth node.

14. The driving circuit of claim 13, wherein, when a voltage of the second node is at a high level, a voltage of the fourth node is at a high level that is substantially equal to the high level of the voltage of the second node, and wherein, when the voltage of the second node is at a low level, the voltage of the fourth node is at a low level that is lower than the low level of the voltage of the second node.

15. A driving circuit comprising stages, the stages comprising: a seventh transistor and an eighth transistor electrically connected between a first voltage input terminal configured to receive a first voltage and a second voltage input terminal configured to receive a second voltage that is lower than the first voltage, and configured to transmit an output signal to a first output terminal; a ninth transistor and a tenth transistor electrically connected between the first voltage input terminal and the second voltage input terminal, and configured to transmit a carry signal to a second output terminal; a first transistor electrically connected between a first node and an input terminal configured to receive a start signal, and comprising a gate configured to receive a clock signal; a fourth transistor electrically connected between the second voltage input terminal and a second node to which a gate of the eighth transistor is electrically connected, and comprising a gate electrically connected to the first node and a back gate configured to receive an alternating current voltage; a fifth transistor electrically connected between the first node and a third node, and comprising a gate electrically connected to the second voltage input terminal; and a first capacitor electrically connected to the third node and to the second output terminal, wherein the back gate of the fourth transistor is electrically connected to the third node.

16. The driving circuit of claim 15, wherein, when a voltage of the first node is at a high level, a voltage of the third node is at a high level that is substantially equal to the high level of the voltage of the first node, and wherein, when the voltage of the first node is at a low level, the voltage of the third node is at a low level that is lower than the low level of the voltage of the first node.

17. The driving circuit of claim 15, further comprising a sixth transistor electrically connected between the first output terminal and the second voltage input terminal, and comprising a gate electrically connected to the third node.

18. The driving circuit of claim 15, further comprising:

a thirteenth transistor and a fourteenth transistor electrically connected between the first voltage input terminal and the second voltage input terminal, and configured to transmit a second carry signal to a third output terminal;

a twelfth transistor electrically connected between the second node and a fourth node, and comprising a gate electrically connected to the second voltage input terminal; and a third capacitor electrically connected to the fourth node and to the third output terminal, wherein the eighth transistor comprises a back gate electrically connected to the fourth node.

19. The driving circuit of claim 18, wherein, when a voltage of the second node is at a high level, a voltage of the fourth node is at a high level that is substantially equal to the high level of the voltage of the second node, and wherein, when the voltage of the second node is at a low level, the voltage of the fourth node is at a low level that is lower than the low level of the voltage of the second node.

* * * * *